United States Patent Office 3,303,048
Patented Feb. 7, 1967

3,303,048
TREATMENT OF POROUS AND FIBROUS MATERIAL TO IMPART WATER REPELLENCY THERETO
Kenneth G. Cooper and Hedley S. B. Marshall, Dinas Powis, Glamorgan, Wales, assignors to Midland Silicones Limited, London, England
No Drawing. Filed Dec. 11, 1963, Ser. No. 329,851
Claims priority, application Great Britain, Dec. 14, 1962, 47,266/62
13 Claims. (Cl. 117—135.5)

This invention relates to the treatment of porous and fibrous materials to render them water repellent. In particular the invention is concerned with the application of the salts of aminoalkylpolysiloxanes to textiles in order to produce thereon a durable water repellent finish.

It has long been known that porous or non-porous substrates can be rendered water repellent by the application thereto of any of a wide variety of organosilicon materials. The best known and most suitable materials have hitherto consisted of dimethylpolysiloxanes and/or methylhydrogen polysiloxanes.

However, although commercially successful as water repellents the dimethyl and methylhydrogenpolysiloxanes have exhibited only fair to moderate durability against the action of soaps, detergents, and solvents. During the operations of dry cleaning or washing the treated fabrics a proportion of the organopolysiloxane coating may be removed or masked which then often leads to a reduction in the water repellency of the treated fabric.

It has also been known that organopolysiloxanes can be prepared which contain silicon-bonded aminoalkyl groups as organic substituents. For example, U.S. Patent No. 2,762,823 discloses inter alia aminoalkyl polysiloxanes of the general formula $$(Q''_2NQ)Q'_b SiO_{3-b/2}$$

where $Q''$ is an alkyl radical or H atom, Q is a divalent saturated aliphatic or cycloaliphatic hydrocarbon radical containing at least 3 C atoms, the amino group being attached to a C atom at least 3 C atoms away from the Si, $Q'$ is a monovalent hydrocarbon or halogenated monovalent hydrocarbon radical free of aliphatic unsaturation, and b is 0 or 1. Certain defined chain-terminated organopolysiloxanes containing among other possible siloxane units aminoalkylalkylsiloxane or aminoalkylarylsiloxane units in which the amino group is linked to the silicon atom thereof through a polymethylene chain of at least three carbon atoms are also known in the art. The latter organopolysiloxanes can be employed as water repellents for such materials as wool, cotton and viscose-acetate fibres.

We have now found that the salts formed by the reaction of aminoalkyl siloxanes with organic and inorganic acids when applied to porous and fibrous materials confer upon them a durable water repellent finish.

According to the present invention there is provided a process for the treatment of porous and fibrous materials which comprises applying thereto a salt which is the reaction product of an aminoalkyl substituted polysiloxane wherein the amino group is attached to the silicon atom through at least three carbon atoms and an organic or inorganic acid, or an organic solvent solution or an emulsion thereof, and thereafter drying the material by the application of heat.

This invention further includes porous and fibrous materials which have been coated or impregnated with the said reaction product of an aminoalkyl substituted polysiloxane and an organic or inorganic acid, or an organic solvent solution or emulsion thereof, and thereafter dried.

The salts employed in the process of this invention are produced by reacting together an organic or inorganic acid and an organopolysiloxane containing the group $$\equiv Si(CH_2)_a NR'R''$$

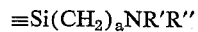

where $a$ is an integer of at least 3 and $R'$ and $R''$ are each hydrogen or an alkyl radical, preferably one containing less than six carbon atoms. Reaction takes place between the components at normal or slightly elevated temperatures to produce the polymer salt of the acid. The viscosity of the organopolysiloxanes is not critical and they can vary in consistency from freely flowing low viscosity liquids to viscous gums. When it is desired to apply the polymer salt without dilution it is preferable that the viscosity of the organopolysiloxane allows the preparation of a liquid, free flowing reaction product.

The organosiloxane polymers employed to prepare the salts herein contain at least one $-(CH_2)_a NR'R''$ substituent bonded directly to silicon in each polymeric molecule. There can be at least one $-(CH_2)_a NR'R''$ substituent bonded to each silicon atom in the polymeric molecule. Other units can be present in the polymer such as $RSiO_{3/2}$ units, $R_2 SiO$ units, $R_3 SiO_{1/2}$ units and $SiO_{4/2}$ units, as well as the $R''R'N(CH_2)_a SiO_{3/2}$,

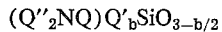

$R''R'N(CH_2)_a \overset{R}{\underset{|}{Si}}O$ units, $R''R'N(CH_2)_a \overset{R_2}{\underset{|}{Si}}O_{1/2}$ units $[R''R'N(CH_2)_a]_2 SiO$ units and $[R''R'N(CH_2)_a]_2 RSiO_{1/2}$ units. The polymers can be homopolymers wherein each and every unit is the same as in a polymer of $$R''R'N(CH_2)_a(CH_3)SiO$$

units as well as copolymers such as 95 mol percent $$(CH_3)_2 SiO$$

units and 5 mol percent $R''R'N(CH_2)_a(CH_3)SiO$ units.

In the formulae in the preceding paragraph each $R''$ and each $R'$ are hydrogen atoms or lower alkyl radicals of 1–6 inclusive carbon atoms, $a$ has a value of at least 3 and does not exceed 18, preferably $a$ is 3–6 inclusive, and the nitrogen is bonded to at least the third carbon atom from the silicon atom. The substituents represented by R are monovalent hydrocarbon radicals or halogenated hydrocarbon radicals including alkyl radicals such as methyl, ethyl, propyl, butyl, nonyl and octadecyl; aryl radicals such as phenyl, naphthyl, diphenyl and anthracyl; alkaryl radicals such as tolyl, xylyl, ethylphenyl and methylnaphthyl; aralkyl radicals such as benzyl and phenethyl; cycloaliphatic radicals such as cyclopropyl, cyclobutyl, cyclohexyl, cyclohexenyl, cyclobutenyl and cyclopentyl; alkenyl radicals such as vinyl, allyl and octadecenyl as well as halogenated derivatives of such radicals as exemplified by chloro-, bromo-, fluoro- and iodo-methyl and ethyl radicals, trichlorovinyl, fluorochlorovinyl, bromobenzyl, chlorotolyl, 3,3,3-trifluoropropyl, perchlorocyclopropyl, bromocyclobutyl, and perchloroethyl radicals.

Preferably the organopolysiloxane employed in the preparation of the polymer salt is a copolymer in which the molecules are made up of at least one siloxane unit containing the aminoalkyl group bonded directly to the silicon atom and siloxane units in which the silicon bonded substituents are selected from monovalent hydrocarbon radicals, for example, methyl, ethyl, propyl, vinyl, and phenyl radicals. It is also preferred that the copolymeric siloxanes are substantially linear in structure although the presence of small proportions of chain branching units in the molecules is not detrimental to the success of this invention. Thus, the preferred polymers are copolymers of

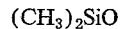
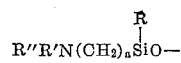

$R''R'N(CH_2)_a \overset{R}{\underset{|}{Si}}O-$ units and $R_2SiO$ units with minor proportions (i.e. less than 2 mol percent) of units selected from $RSiO_{3/2}$ units, $R_2SiO_{1/2}$ units, $SiO_{4/2}$ units, $R''R'N(CH_2)_aSiO_{3/2}$ units and $R''R'N(CH_2)_aR_2SiO_{1/2}$ units. Examples of suitable aminoalkyl polysiloxanes include copolymers of methyl (γ-aminopropyl) siloxane units and dimethylsiloxane or phenylmethylsiloxane units; copolymers of dimethylsiloxane units, methyl(γ-aminopropyl)siloxane units and dimethyl(γ-aminopropyl)siloxane units and aminobutyl substituted siloxane polymers and copolymers. The preferred siloxanes contain at least 1 aminoalkyl group per 100 silicon atoms present.

Examples of acids which can be employed in the preparation of the treating composition of this invention are organic acids, for example, monocarboxylic acids such as acetic, propionic, valeric, decoic, stearic, benzoic and acrylic acids; halogenated organic acids such as trichloroacetic acid, bromoethanoic acid, fluoroethanoic acid, 3-chloropropanoic acid, 2,3-dibromopropanoic acid, 3-bromopropanoic acid, dibromostearic acid, 9,10,12,13,15, 16-hexabromooctadecanoic acid, 2-bromopentanoic acid, o-, m- and p-bromobenzoic acid, o-, m- and p-chlorobenzoic acid, dibromo- and dichloro benzoic acids, o-, m- and p-fluorobenzoic acids, o-, m-, and p-iodobenzoic acids, tribromo- and trichloro-benzoic acids, and 2- and 3-chloropropanoic acids, and sulphonic acids such as benzene sulphonic acid and p-toluene sulphonic acid. Also suitable are inorganic acids, for example, hydrochloric acid, sulphuric acid, phosphoric acid and boric acid.

In carrying out the process of the present invention the salt of the aminoalkyl polysiloxane can be dissolved in an organic solvent or it can be emulsified and the solution or emulsion employed to treat the porous and fibrous material. Application of the solution or emulsion to the substrate can be achieved by any of the usual methods, for example, by padding, dipping or spraying.

The polymer salts are soluble in solvents such as toluene, benzene and white spirit when the proportion of substituents containing the aminoalkyl salt grouping in the polymer is small and the salts can be applied to the substrate from such solvents. However, an increase in the proportion of the aminoalkyl salt substituents present will require the use of a more polar solvent such as methyl alcohol as the carrier. The solubility of the salts in various solvents will also depend to some extent upon the nature of the salt groups.

The concentration of the treating solution or emulsion is not critical. We have found that the treatment can be conveniently carried out from an organic solvent solution or an emulsion containing from 0.1 to 10% by weight of the polymer salt. If desired, however, the pick-up of siloxane on the fabric can be varied by varying the concentration of the siloxane in treating medium. The impregnated fabric can be dried by heating, exposure to a temperature of about 100° C. for 20–30 minutes normally being sufficient to accomplish this. A further heating step at 150° C. for a short period can be given if desired.

Although the process of the present invention can be employed for the treatment of a wide variety of porous and fibrous materials including paper and leather it is particularly useful for producing a durable water repellent finish on synthetic fabrics such as rayon, viscose acetate fabrics, Dacron and nylon. Paper, when treated by the process of this invention, exhibits not only water repellency but also possesses good release properties.

The following examples are included herein to aid those skilled in the art in gaining an understanding of this invention. The scope of the invention is defined in the claims and is not restricted by the examples.

*Example 1*

The acetate salt of a copolymer comprising 5 mol percent of methyl(γ-aminopropyl)siloxane units and 95 mol percent of dimethylsiloxane units and endblocked with trimethylsiloxy units was prepared by adding 1.0 gm. of glacial acetic acid (slight excess) at 25° C. to 25.0 gm. of the copolymer. An exothermic reaction took place and the product of the reaction was a colorless fluid having a viscosity greater than that of the original aminopropyl siloxane copolymer.

A 1% by weight solution of the polymer salt in toluene was employed in the treatment of cotton by padding to a mangle expression such that the cotton picked up the equivalent of about 1% of its weight of the siloxane. After treatment the cotton was dried at 100° C. for 30 minutes and was then heated for a further 5 minutes at 150° C.

Samples of the treated cotton were subjected to the Bundesmann adsorption test and to analysis for silicon content. Further samples of the treated cotton were subjected to the same tests after 3 hours Soxhlet extraction with hot benzene and after application of the S.D.C. No. 3 Test involving washing in a boiling aqueous solution of soap and soda for 3 hours.

The results obtained are listed in Table I which also gives, in parentheses, comparative values obtained on cotton treated with a mixture of a conventional methylhydrogen siloxane water repellent and crease resist resin.

TABLE I

|  | Percent Absorption | Penetration (cc.) | Percent Silicon |
|---|---|---|---|
| Sample as treated | 40 (11) | 1 (0) | 0.45 (0.95) |
| After 3 hrs. extraction with benzene | 32 (20) | 0 (3) | 0.42 (0.62) |
| After S.D.C. No. 3 Test | 58 (105) | 8 (28) | 0.44 (0.44) |

*Example 2*

The hydrochloride salt of the copolymer employed to prepare the acetate salt of Example 1 was produced by bubbling anhydrous HCl through a toluene solution of the copolymer.

The resulting product was further diluted with toluene to give a solution containing about 1% of the salt. This diluted solution was used to treat cotton fabric by padding after which the fabric was dried at 150° C. The treated cotton was then subjected to the Bundesmann test and to analysis for silicon content as described in Example 1 and the following results obtained.

TABLE II

|  | Percent Absorption | Penetration (cc.) | Percent silicon |
|---|---|---|---|
| Sample as treated | 55 | 2 | 0.26 |
| After 3 hrs. extraction in benzene | 40 | 0 | 0.26 |
| After S.D.C. No. 3 Test for 3 hrs | 58 | 8 | 0.1 |

*Example 3*

0.69 g. of decoic acid was added at 25° C. to 175 g. of an approximately 6% by weight solution in toluene of a copolymer comprising 3 mol percent methyl(γ-aminobutyl)siloxane and 97 mol percent of dimethylsiloxane endblocked with trimethylsiloxy units. The resulting solution was then employed in the treatment of Terylene (registered trademark) fabric by padding. After drying at 150° C. the treated fabric was subjected to water repellency tests and analysis for silicon content as described in Example 1, except that the duration of the S.D.C. No. 3 Test was extended to 6 hours.

TABLE III

|  | Percent Absorption | Silicon content, percent |
|---|---|---|
| Fabric untreated | 68 | |
| Fabric as treated | 24 (10) | 1.40 (0.93) |
| After 3 hrs. extraction in benzene | 26 (10) | 1.10 (0.54) |
| After S.D.C. No. 3 Test for 6 hours | 25 (38) | 1.08 (0.48) |

The figures in parentheses are comparative results obtained when Terylene fabric is treated with a conventional siloxane water repellent.

Example 4

A polymer salt was obtained by the procedure of Example 3 wherein the decoic acid was replaced by oleic acid.

Dacron was treated with this salt and tested in the manner described in Example 3 and the following results were obtained.

TABLE IV

|  | Percent Absorption | Silicon content, percent |
|---|---|---|
| Sample as treated | 23 | 1.36 |
| After 3 hrs extraction in benzene | 18 | 0.96 |
| After S.D.C. No. 3 Test for 6 hours | 24 | 1.30 |

Example 5

Acetic acid was added to a trimethylsiloxane endblocked copolymer comprising 3 mol percent of methyl-(γ-aminobutyl)siloxane and 97 mol percent of dimethylsiloxane in an approximately 6% by weight solution in toluene. After addition of the acetic acid the solution was used to treat nylon fabric by padding, the treated fabric then being dried at about 150° C.

The water repellency and silicon content of the treated fabric were then measured as described in Example 3. The results are shown in Table V below.

TABLE V

|  | Percent Absorption | Silicon content, percent |
|---|---|---|
| Untreated | 64 | |
| Fabric as treated | 28 (10) | 1.22 (1.49) |
| After 3 hrs. extraction with benzene | 28 (11) | 0.78 (0.68) |
| After S.D.C. No. 3 Test for 6 hrs | 28 (38) | 1.30 (0.92) |

In the table above the figures in parentheses are comparative values obtained with nylon fabric which had been treated with a conventional siloxane water repellent.

Example 6

The acetate salt of a copolymer comprising 5 mol percent of methyl(γ-aminopropyl)siloxane units and 95 mol percent of dimethylsiloxane units and endblocked with trimethylsiloxy units was prepared as described in Example 1. An emulsion of the copolymer salt was then prepared by adding the salt to an equal weight of water with rapid stirring. This emulsion was diluted with water to 2% silicone solids and the diluted emulsion employed to impregnate cotton by padding through to a 65% mangle expression.

After being air dried for 10 minutes, followed by heating at 150° C. for a further 10 minutes, the treated cotton was allowed to cool and then evaluated by the test procedure described in Example 1 except that the period of the S.D.C. No. 3 Test was extended to 6 hours.

The absorption and penetration values obtained are shown in Table VI below

TABLE VI

|  | Percent Absorption | Penetration (cc.) | Percent silicon |
|---|---|---|---|
| Sample as treated | 38 | 3 | 0.98 |
| After 3 hrs. extraction | 38 | 1 | 0.94 |
| After S.D.C. No. 3 Test for 6 hours | 77 | 14 | 0.80 |

It will be seen from Tables III, IV and V that the treatment of synthetic fabrics by the process of the present invention confers upon them an excellent level of water repellency which is hardly diminished on subjecting the fabrics to severe solvent or washing treatments.

Cotton which has been treated by the process of the present invention exhibits a fair standard of water repellency. However, it will be noted that this standard is substantially maintained after the treated cotton has been subjected to solvent extraction and soap and soda washing under quite severe conditions.

Example 7

Equivalent results were achieved when Example 1 was repeated employing in place of the acetic acid an equivalent amount of any of the following trichloroacetic acid, sulfuric acid, benzoic acid, stearic acid, fluoroethanoic acid, 3-chloropropanoic acid, acrylic acid, benzene sulphonic acid, p-toluene sulphonic acid, phosphoric acid and boric acid.

Example 8

Equivalent results were achieved when Example 2 was repeated employing an equivalent amount of each of the following polymers: 15 mol percent phenyl(γ-aminopropyl)siloxane, 80 mol percent dimethylsiloxane, 5 mol percent phenylmethylsiloxane and vinyldimethylsiloxane enblocker; 5 mol percent of any of methyl(γ-aminobutyl)-, vinyl(α-methylaminopropyl)-, ethyl(6-aminohexyl)-, 3,3,3 - trifluoropropyl(γ-methylethylaminopropyl)-, octyl(10-aminooctyl) - methyl(γ-pentylaminopropyl)-siloxane units and 95 mol percent dimethylsiloxane units enblocked with vinyldimethylsiloxane units or trimethylsiloxane units; and $$(CH_3)_3SiO[(H_2NCH_2CH_2CH_2)CH_3SiO]_zSi(CH_3)_3$$

where z has a value of about 15.

Example 9

Excellent water repellency and release characteristics were achieved when the polymer of Example 1 was applied in similar fashion to paper, cotton, rayon, viscose acetate fibers and wool.

That which is claimed is:
1. In a method for rendering materials water repellent the improvement comprising applying thereto the reaction product of:
(a) an aminoalkyl substituted organopolysiloxane containing in each molecule at least one

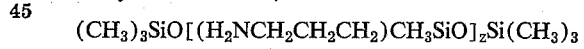

substituent bonded directly to silicon the units present in the molecule being selected from the group consisting of $RSiO_{3/2}$ units, $R_2SiO$ units, $R_3SiO_{1/2}$ units, $SiO_{4/2}$ units, $R''R'N(CH_2)_aSiO_{3/2}$ units,

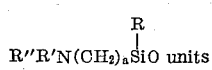

$R''R'N(CH_2)_aSi(R)_2O_{1/2}$ units, $[R''R'N(CH_2)_a]_2SiO$ units and $[R''R'N(CH_2)_a]_2RSiO_{1/2}$ units wherein each R' and R'' is selected from the group consisting of hydrogen atoms and alkyl radicals, $a$ has a value of at least 3, the R''R'N— group is bonded to at least the third carbon atoms removed from the silicon atom and each R is selected from the group consisting of monovalent hydrocarbon and halogenohydrocarbon radicals and (b) an acid selected from the group consisting of monocarboxylic acids, mineral acids, sulphonic acids and halogenated monocarboxylic acids.

2. The method of claim 1 further characterized in that the reaction product is employed in an aqueous system.

3. The method of claim 1 further characterized in that the reaction product is employed in an organic solvent system.

4. The method of claim 1 further characterized in that R' and R'' are hydrogen atoms, $a$ is 3 and the organic substituents are methyl radicals.

5. The method of claim 1 further characterized in that the acid is a monocarboxylic acid.

6. The method of claim 1 further characterized in that the acid is hydrochloric acid.

7. In a method for rendering fibrous materials water repellent, the improvement comprising (1) applying thereto the reaction product of (a) an essentially linear aminoalkylorganosiloxane containing at least one aminoalkyl radical per molecule present as a siloxane unit of the formula $R''R'N(CH_2)_aSi(R)O$ where each R'' and each R' is selected from the group consisting of hydrogen atoms and alkyl radicals, $a$ has a value from 3 to 10 inclusive, the amino group is bonded to the silicon atom through at least 3 carbon atoms, and R is a monovalent radical selected from the group consisting of hydrocarbon and halogenohydrocarbon radicals, any remaining siloxane units being selected from the formulae $R_2SiO$ and $R_3SiO_{1/2}$ where R is as above defined and (b) an acid selected from the group consisting of monocarboxylic acids, halogenated monocarboxylic acids, sulphonic aicds and mineral acids, and (2) thereafter drying the fibrous material by the application of heat.

8. The method of claim 7 further characterized in that R' and R'' are hydrogen atoms, $a$ is an integer selected from 3, 4 and 5, R is a methyl radical and the acid is a monocarboxylic acid.

9. The method of claim 7 further characterized in that the reaction product is present in the liquid form in an amount from 0.1 to 10% inclusive by weight.

10. The method of rendering a fibrous material water repellent comprising (A) applying thereto an organosiloxane prepared by reacting (a) an essentially linear organosiloxane copolymer containing at least 1 mol percent of units of the formula $R'R''N(CH_2)_a(R)SiO$ wherein each R is a monovalent hydrocarbon radical, each R' and each R'' is selected from the group consisting of hydrogen atoms and alkyl radicals of 1 to 6 inclusive carbon atoms, $a$ has a value of 3 to 10 inclusive, the R'R''N group being bonded to a carbon atoms other than the alpha- and beta-carbon atoms, the remainder of the siloxane units present being selected from $R_2SiO$ units and $R_3SiO$ units where R is as above defined, with (b) an acid selected from the group consisting of monocarboxylic acids and mineral acids and (B) drying the material by the application of heat.

11. The method of claim 10 further characterized by (C) further heating the dried material to cure the siloxane.

12. The method of claim 10 wherein R' and R'' are hydrogen atoms, $a$ is 3–5, R is methyl and the acid is a monocarboxylic acid.

13. The method of claim 10 wherein R' and R'' are hydrogen atoms, $a$ is 3–5, R is methyl and the acid is hydrochloric acid.

References Cited by the Examiner

UNITED STATES PATENTS

| | | | |
|---|---|---|---|
| 2,715,133 | 8/1955 | Speier | 260—448.2 |
| 2,762,823 | 7/1956 | Speier | 260—448.2 |
| 2,823,195 | 2/1958 | Shorr et al. | 260—448.2 |
| 2,832,754 | 4/1958 | Jex et al. | 260—448.2 |
| 2,972,598 | 2/1961 | Morehouse | 260—448.2 |
| 3,085,908 | 4/1963 | Morehouse et al. | 117—161 X |

WILLIAM D. MARTIN, *Primary Examiner.*

T. G. DAVIS, *Assistant Examiner.*

UNITED STATES PATENT OFFICE
CERTIFICATE OF CORRECTION

Patent No. 3,303,048                  February 7, 1967

Kenneth G. Cooper et al.

It is hereby certified that error appears in the above numbered patent requiring correction and that the said Letters Patent should read as corrected below.

Column 6, line 39, for "enblocker" read -- endblockers --; line 40, for "vinyl($\alpha$-" read -- vinyl($\gamma$- --; line 44, for "enblocked" read -- endblocked --.

Signed and sealed this 7th day of November 1967.

(SEAL)
Attest:

Edward M. Fletcher, Jr.
Attesting Officer

EDWARD J. BRENNER
Commissioner of Patents